(12) United States Patent
Kitano

(10) Patent No.: US 11,009,491 B2
(45) Date of Patent: May 18, 2021

(54) ANALYTIC DATA ANALYZER AND ANALYTIC DATA ANALYZING PROGRAM

(71) Applicant: SHIMADZU CORPORATION, Kyoto (JP)

(72) Inventor: Riki Kitano, Kyoto (JP)

(73) Assignee: SHIMADZU CORPORATION, Kyoto (JP)

(*) Notice: Subject to any disclaimer, the term of this patent is extended or adjusted under 35 U.S.C. 154(b) by 648 days.

(21) Appl. No.: 15/758,543

(22) PCT Filed: Sep. 9, 2015

(86) PCT No.: PCT/JP2015/075642
§ 371 (c)(1),
(2) Date: Aug. 9, 2018

(87) PCT Pub. No.: WO2017/042917
PCT Pub. Date: Mar. 16, 2017

(65) Prior Publication Data
US 2018/0348180 A1     Dec. 6, 2018

(51) Int. Cl.
*G01N 30/86* (2006.01)
*G01N 27/62* (2021.01)
(Continued)

(52) U.S. Cl.
CPC ......... *G01N 30/8696* (2013.01); *G01N 27/62* (2013.01); *G01N 35/00* (2013.01);
(Continued)

(58) Field of Classification Search
CPC .... G01N 30/8696; G01N 35/00; G01N 27/62; G01N 30/8651; G01N 2030/8804; G01N 30/8679
See application file for complete search history.

(56) References Cited

U.S. PATENT DOCUMENTS

2002/0123991 A1* 9/2002 Asami .................. G06F 16/235

FOREIGN PATENT DOCUMENTS

JP 2006-313171 A 11/2006
WO 02/068963 A1 9/2002

OTHER PUBLICATIONS

Communication dated Aug. 2, 2019, from the European Patent Office in counterpart European Application No. 15903580.7.
(Continued)

*Primary Examiner* — Alexander Satanovsky
(74) *Attorney, Agent, or Firm* — Sughrue Mion, PLLC

(57) ABSTRACT

A quantitative analysis assistant program that creates a quantitative table showing the relationship of compounds, quantitative values and other related information for each of two data files A and B, and displays on each of the view areas "a" and "b". The analysis operator specifies one compound in one of the quantitative tables. Then, the other quantitative table is automatically searched for a compound having a name identical to the specified compound. A chromatogram, mass spectrum and other related information corresponding to that compound and are based on data file B are displayed on the view area "b" along with the quantitative table. Then, measurement results corresponding to the compound based on data file A are displayed on view area "a" along with the quantitative table. A comparison of the measurement or quantitative determination results for the same component can be easily and efficiently performed in a simultaneous multicomponent analysis.

4 Claims, 3 Drawing Sheets

(51) Int. Cl.
*G01N 35/00* (2006.01)
*G01N 30/88* (2006.01)

(52) U.S. Cl.
CPC ..... *G01N 30/8651* (2013.01); *G01N 30/8679* (2013.01); *G01N 2030/8804* (2013.01)

(56) References Cited

OTHER PUBLICATIONS

Communication dated Dec. 10, 2019, from the China National Intellectual Property Administration in counterpart Application No. 201580083049.0.
International Search Report in International Application No. PCT/JP2015/075642, dated Dec. 15, 2015.
International Preliminary Report on Patentability with a Translation of Written Opinion in International Application No. PCT/JP2015/075642, dated Mar. 13, 2018.
"GCMSsolution: Gasu Kuromatogurafu Shitsuryou Bunsekikei You Waakusuteeshon (GCMSsolution: Workstation for Gas Chromatograph Mass Spectrometer)", [online], Shimadzu Corporation, accessed on Aug. 21, 2015, 2 pages, the Internet URL:http://www.an.shimadzu.co.jp/gcms/gcmssol/index.htm>.
"LaGCMS-QP2010 Ultra: Gasu Kuromatogurafu Shitsuryou Bunsekikei (LaGCMS-QP2010 Ultra: Gas Chromatograph Mass Spectrometer)", [online], Shimadzu Corporation, accessed on Aug. 21, 2015, 1 page, the Internet <URL:http://www.an.shimadzu.co.jp/gcms/ultra/ultra5.htm>.
"LabSolutions Insight: GC/MS & LC/MS You Takentai Teiryou Shien Sofutouea (LabSolutions Insight: Multi-Analyte Quantitation Software for GC/MS & LC/MS)", [online], Shimadzu Corporation, accessed on Aug. 21, 2015, 5 pages, the Internet <URL: http://www.an.shimadzu.co.jp/data-net/labsolutions/insight/index.htm>.

\* cited by examiner

ANALYTIC DATA ANALYZER AND ANALYTIC DATA ANALYZING PROGRAM

CROSS REFERENCE TO RELATED APPLICATIONS

This application is a National Stage of International Application No. PCT/JP2015/075642 filed Sep. 9, 2018.

TECHNICAL FIELD

The present invention relates to an analytic data analyzer for analyzing data obtained with various types of analyzing devices, such as a gas chromatograph (GC), liquid chromatograph (LC), gas chromatograph mass spectrometer (GC-MS) or liquid chromatograph mass spectrometer (LC-MS), as well as to an analytic data analyzing program which runs on a computer. More specifically, the present invention relates to an analytic data analyzer and analytic data analyzing program suitable for a simultaneous multicomponent analysis in which a number of components (compounds or elements) in a sample are simultaneously subjected to quantitative determination.

BACKGROUND ART

In recent years, dedicated data-processing software applications previously installed on personal computers have been commonly used for the task of analyzing data collected with a GC-MS, LC-MS or other analyzing devices. In particular, in the testing of residual agricultural chemicals in foods, testing of contaminants in environmental water, testing of drugs and poisons, as well as other similar areas, simultaneous multicomponent analyses for hundreds or even a greater number of compounds have been performed using GC-MS or LC-MS. Data processing software has been essential for efficiently analyzing an extremely large amount of data obtained by such an analysis.

Hereinafter described is an example of a quantitative analysis in a simultaneous multicomponent analysis using a GC-MS. For example, the products disclosed in Non Patent Literature 1 or 2 have been commonly known as data processing software for such analyses. In the following descriptions, the terms "GC-MS" and "LC-MS" should be construed as inclusive of "GC-MS/MS" and "LC-MS/MS" in which a mass spectrometer capable of an MS/MS (or MS$^n$) analysis, such as a triple quadrupole mass spectrometer, is used as the mass spectrometer, unless otherwise noted.

For example, the task of analyzing data using the data processing software disclosed in Non Patent Literature 1 is performed as follows: An analysis operator (user) specifies a data file to be analyzed (which is normally a file that contains measurement data obtained by a measurement of one sample or quantitative data based on the measurement data). Then, a quantitative table showing the quantitative values of the individual target compounds subjected to the measurement, mass chromatogram or mass spectrum corresponding to one compound in the table, and other related information are displayed on the screen of a display unit. When any one of the compounds on the table is selected by the analysis operator, the software displays the mass chromatogram or mass spectrum corresponding to the selected compound, as well as the quantitative information, such as the calibration curve used for the quantitative determination of the compound. Viewing the screen, the analysis operator can intuitively proceed with the analyzing task.

When it is necessary to find appropriate measurement conditions in an GC-MS, or when the appropriate measurement conditions are unknown, the same sample may be subjected to a measurement multiple times under different measurement conditions. Even under the same measurement conditions, the same sample may be subjected to a measurement multiple times to detect different combinations of compounds. For example, in the case of finding appropriate measurement conditions for a specific sample, it is necessary to perform such a task in which two results of quantitative determination for a specific compound are compared with each other based on the measurement data of the same sample obtained under different measurement conditions A and B. Such a task has conventionally been performed as follows: An appropriate data processing software is executed concurrently in two separate execution windows on a personal computer. A data file obtained by the measurement under measurement condition A is read by the software in one execution window, while a data file obtained by the measurement under measurement condition B is read by the software in the other execution window. On each of the execution windows of the data processing software which show the results of the quantitative analysis and other related information based on the different sets of data, the analysis operator performs predetermined operations to search for the quantitative determination result for the same compound, and compares the quantitative determination results with each other or performs a difference analysis.

CITATION LIST

Non Patent Literature

Non Patent Literature 1: "GCMSsolution: Gasu Kuromatogurafu Shitsuryou Bunsekikei You Waakusuteeshon (GCMSsolution: Workstation for Gas Chromatograph Mass Spectrometer)", [online], Shimadzu Corporation, [accessed on Aug. 21, 2015], the Internet.

Non Patent Literature 2: "LabSolutions Insight: GC/MS & LC/MS You Takentai Teiryou Shien Sofutouea (LabSolutions Insight: Multi-Analyte Quantitation Software for GC/MS & LC/MS)", [online], Shimadzu Corporation, [accessed on Aug. 21, 2015], the Internet.

Non Patent Literature 3: "LaGCMS-QP2010 Ultra: Gasu Kuromatogurafu Shitsuryou Bunsekikei (LaGCMS-QP2010 Ultra: Gas Chromatograph Mass Spectrometer)", [online], Shimadzu Corporation, [accessed on Aug. 21, 2015], the Internet.

SUMMARY OF INVENTION

Technical Problem

In a simultaneous multicomponent analysis using a GC-MS or LC-MS, there may be several tens of compounds, or even one hundred and several tens of compounds, to be subjected to the measurement. The number of compounds to be listed in the quantitative table is also extremely large. Therefore, it has been considerably cumbersome and inefficient for the analysis operator to perform operations on a plurality of execution windows of the data processing software to search for the quantitative determination results and other related information for the same compound.

The present invention has been developed in view of such a problem. Its objective is to provide an analytic data analyzer and analytic data analyzing program with which the task of comparing measurement results, quantitative determination results and other related information on the same compound can be easily and efficiently performed based on data obtained by performing a measurement for the same sample under different measurement conditions or the like.

Solution to Problem

The analytic data analyzer according to the present invention developed for solving the previously described problem is an analytic data analyzer for quantitatively analyzing a plurality of components based on data obtained by a measurement of a sample containing the plurality of components, the analytic data analyzer including:

a) a table creation processor for creating tables based on a plurality of data files specified by an analysis operator, one table for each data file, and for displaying the tables concurrently or in a switchable manner on a screen of a display unit, where each of the data files contains data obtained by a single measurement, and each of the tables lists measurement results and/or quantitative determination results for a plurality of components subjected to the measurement;

b) a component specifier for allowing an analysis operator to select and specify any one of the components in one of the plurality of tables displayed concurrently or in a switchable manner on the screen of the display unit;

c) an identical-name-component searcher for searching another one of the tables for an identical-name component which is a component having a name identical to the component specified by the component specifier, and for selecting the identical-name component in the table concerned when the identical-name component is located; and d) an information display processor for displaying a measurement result and/or quantitative determination result for the one component specified in one table by the component specifier, as well as a measurement result and/or quantitative determination result for the identical-name component located by the identical-name-component searcher, along with the plurality of tables on the screen of the display unit, based on the plurality of data files.

The analytic data analyzing program according to the present invention developed for solving the previously described problem is an analytic data analyzing program which makes a computer operate as the previously described analytic data analyzer according to the present invention.

In the case where the table creation processor, component specifier, identical-name-component searcher and information display processor in the analytic data analyzer according to the present invention are embodied by running the analytic data analyzing program according to the present invention on a computer, those components may be embodied by a single piece of application software, or they may be embodied by a plurality of pieces of application software which are concurrently executed.

For example, in the case where the same application software can be concurrently executed in a plurality of execution windows on one computer, the program may be configured to be capable of opening one data file in each execution window of the application software and searching for an identical-name component in one table created in one execution window of the application software when one component has been specified in the table created and displayed in another execution window of the application software.

In the analytic data analyzer according to the present invention, for example, an analysis operator specifies two data files obtained from the same sample by two measurements performed under different measurement conditions. Based on the data contained in each of the two data files, the table creation processor creates a table in which the measurement results and/or quantitative determination results for the components subjected to the measurement are listed. The two tables are displayed on the screen of the display unit either concurrently or in a switchable manner using a tabbed document interface or other graphical user interface components. Thus, two tables which show measurement results obtained from the same sample by two measurements under different conditions are displayed concurrently or in a switchable manner on the screen of the display unit. In the case of a simultaneous multicomponent analysis using a GC-MS or similar device, there are normally a considerable number of compounds listed on those tables. For example, the number of rows of each table will be considerably large if one row is assigned to one compound.

The component specifier includes an input unit which is a user interface, such as a pointing device, keyboard and the like. An analysis operator selects any one of the components in one of the tables by operating the input unit. The selected component is designated as the component to be displayed in the same table. The identical-name-component searcher searches for an identical-name component which has a name identical to the designated component in another one of the tables which is displayed concurrently or in a switchable manner. If the identical-name component has been located, the located identical-name component is designated as the component to be displayed in the table. If no identical-name component has been located, a notification can be given, for example, by a popup message on the screen of the display unit so that the analysis operator can recognize that the identical-name component is not present.

The information display processor displays the measurement result or quantitative determination result for one component specified in one table by the component specifier, and the measurement result or quantitative determination result for an identical-name component located through the search by the identical-name-component searcher, along with the plurality of tables on the screen of the display unit. For example, if the analyzing device is a GC-MS or LC-MS, the measurement results each include a mass chromatogram at a mass-to-charge ratio corresponding to the component concerned and a mass spectrum at the retention time of the same component. The quantitative determination results each include peak information, such as the peak area and peak height based on the chromatogram, as well as a calibration curve.

Thus, in the analytic data analyzer and analytic data analyzing program according to the present invention, when one component of interest is specified by an analysis operator in one of the tables respectively created from a plurality of data files, the other tables are automatically searched for a component with an identical name. If an identical component has been located, the measurement result and/or quantitative determination result for that component is displayed.

The analytic data analyzer and analytic data analyzing program according to the present invention can be applied in various types of analyzing devices or measurement devices used for performing a measurement on a sample to determine the quantities of a plurality of components, i.e. a plurality of compounds or elements, contained in the sample. The present invention is particularly useful in the case where there a large number of components to be subjected to a measurement. Therefore, the present invention is typically suitable for analyzing data obtained with a GC, LC, GC-MS, LC-MS or similar devices. As other examples, the present invention can also be applied in a device for determining the quantities of various elements contained in a sample, such as a fluorescent X-ray analyzer and other types of X-ray analyzers as well as an inductively coupled plasma (ICP) emission spectrometer.

Advantageous Effects of the Invention

With the analytic data analyzer and analytic data analyzing program according to the present invention, for example, it is possible to easily compare measurement results or quantitative determination results for the same compound based on data obtained by a measurement performed on the same sample under different measurement conditions, so that the efficiency of such an analyzing task will be improved. The analytic data analyzer and analytic data analyzing program according to the present invention can also be used for a comparison of measurement results or quantitative determination results based on a plurality of sets of data obtained by performing measurements on the same sample using different types of measurement devices, such as a GC-MS and an LC-MS.

DESCRIPTION OF EMBODIMENTS

One embodiment of a GC-MS system including an analytic data analyzer according to the present invention is hereinafter described in detail with reference to the attached drawings.

Figure 1:
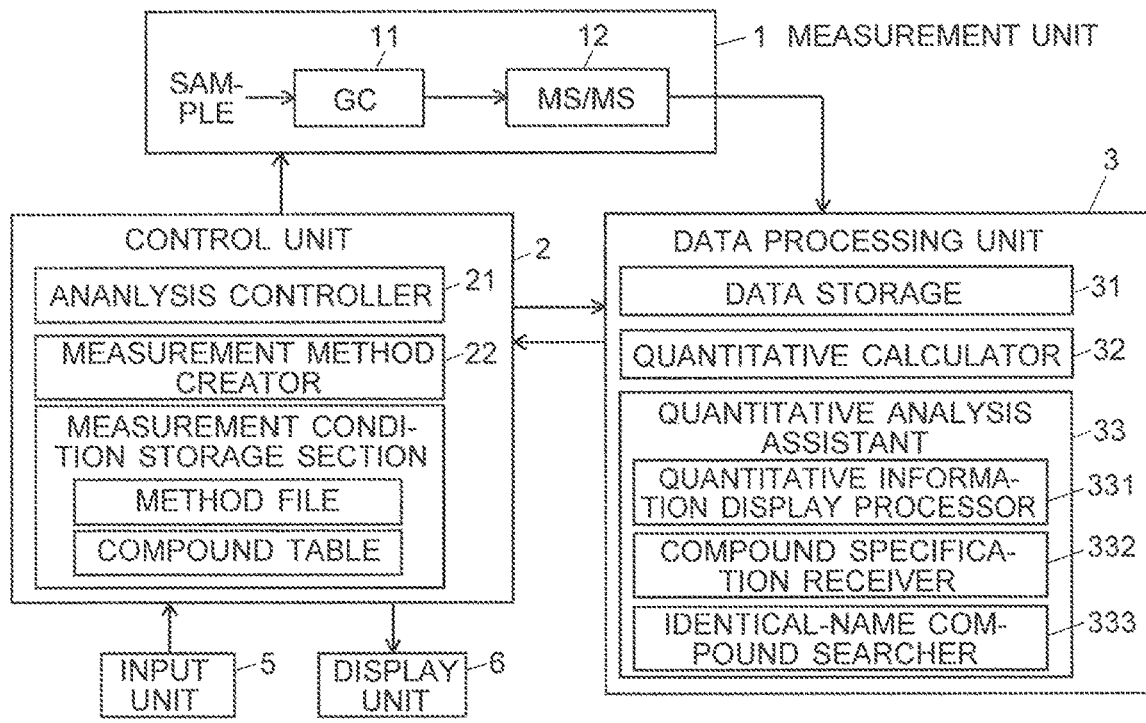
FIG. 1 is a schematic configuration diagram of one embodiment of a GC-MS system using an analytic data analyzer according to the present invention.
Figure 2:
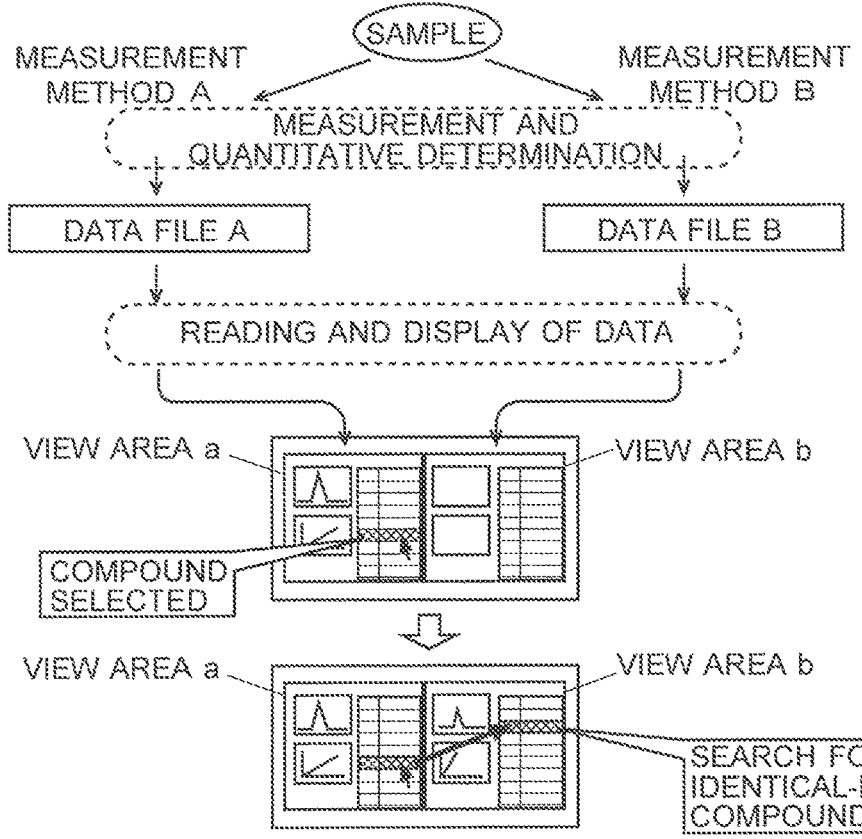
FIG. 2 is a diagram illustrating a characteristic analyzing process in the GC-MS system according to the embodiment.
Figure 3:
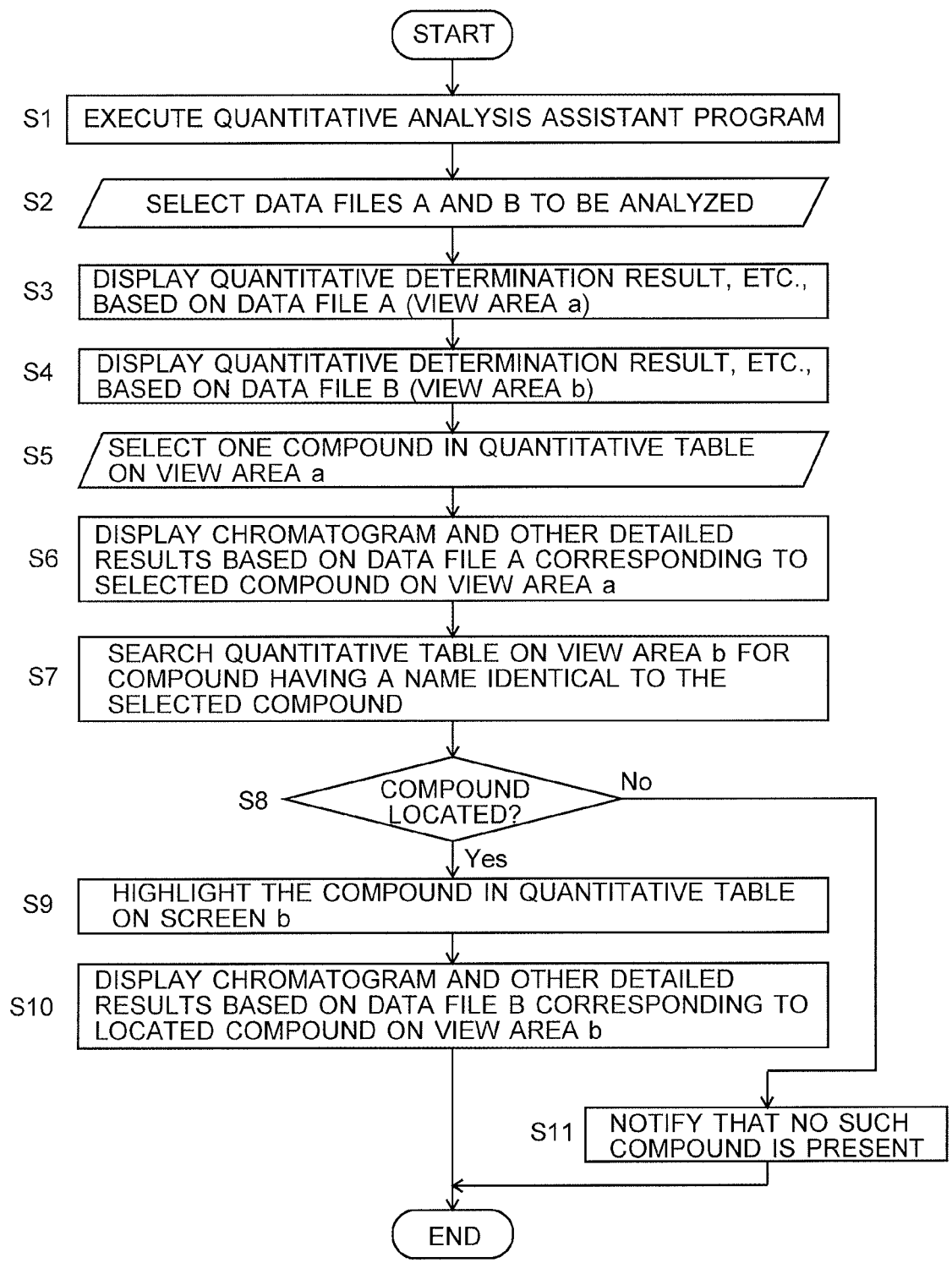
FIG. 3 is a flowchart showing the working procedure and processing operation for a characteristic quantitative analysis in the GC-MS system according to the embodiment.
Figure 4:
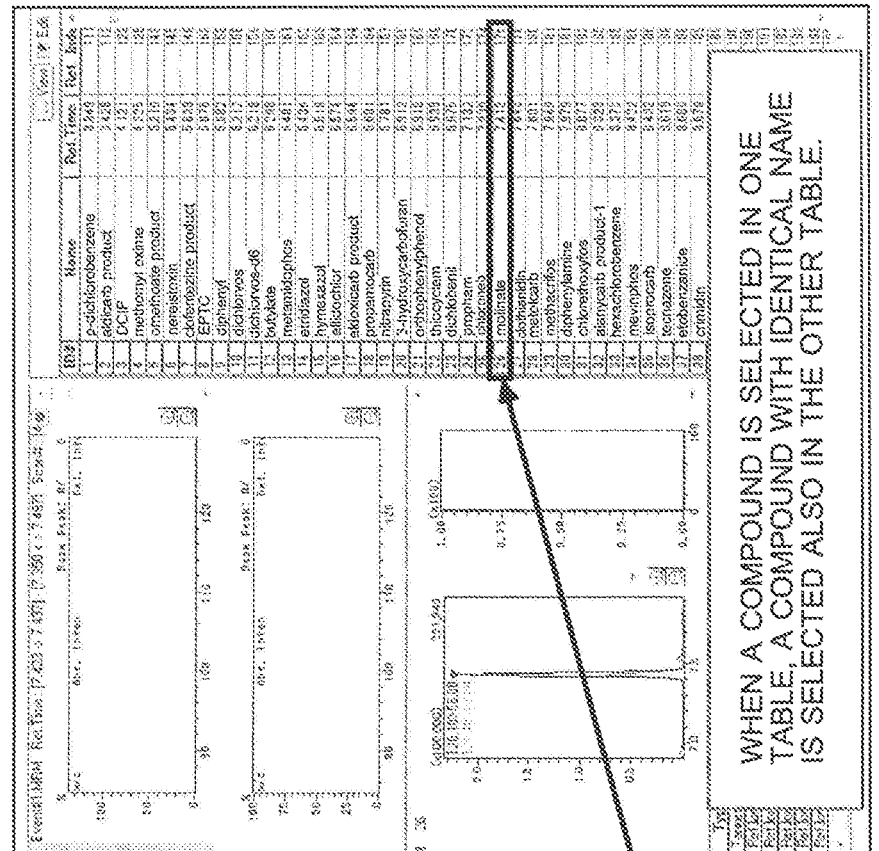
FIG. 4 is a graphic showing an example of a display by a characteristic analyzing process in the GC-MS system according to the embodiment.
Figure 4:
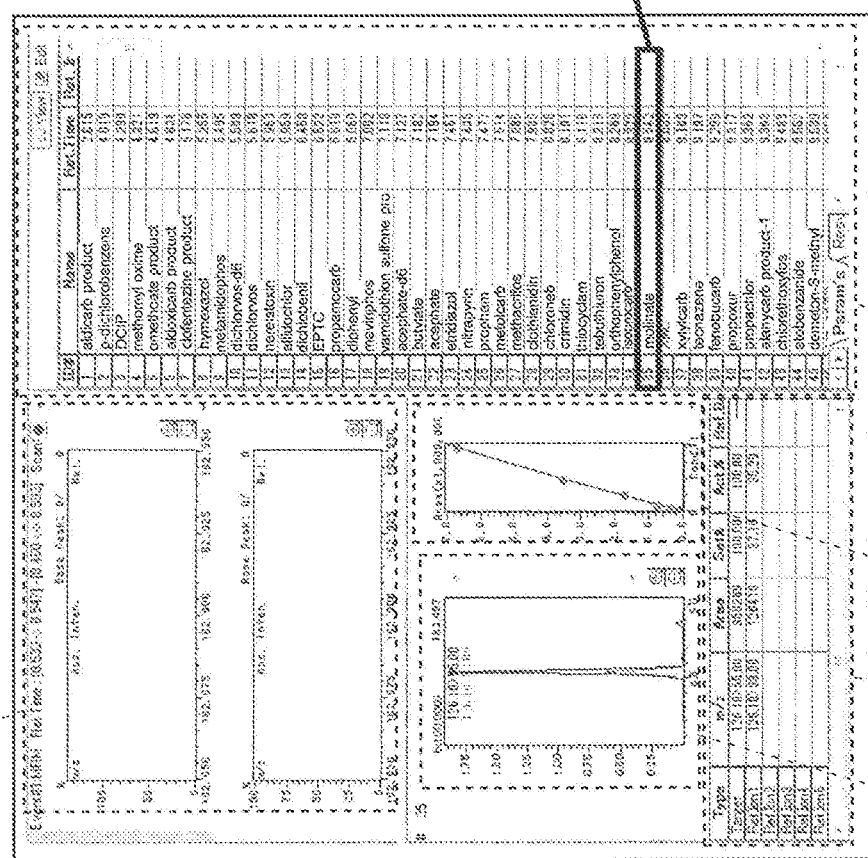

FIG. 1 is a schematic configuration diagram of the GC-MS system according to the present embodiment. FIG. 2 is a diagram illustrating a characteristic analyzing process in the GC-MS system according to the embodiment. FIG. 3 is a flowchart showing the working procedure and processing operation for a characteristic quantitative analysis in the GC-MS system according to the embodiment. FIG. 4 is a graphic showing an example of a display by a characteristic analyzing process in the GC-MS system according to the embodiment.

The GC-MS system according to the present embodiment includes a measurement unit 1, control unit 2, data processing unit 3, input unit 5 and display unit 6.

The measurement unit 1 includes a GC section 11 in which various compounds contained in an injected sample are temporally separated, and an MS/MS section 12 in which the compounds separated by the GC section 11 are subjected to mass spectrometry in order of their elution and detected. The MS/MS section 12 is a mass spectrometer capable of an MS/MS analysis, such as a triple quadrupole mass spectrometer or Q-TOF mass spectrometer. A normal (single) type of mass spectrometer, such as a quadrupole mass spectrometer, may also be used. Detection signals obtained in the MS/MS section 12 are converted into digital data by an analogue-to-digital converter (not shown) and sent to the data processing unit 3.

The control unit 2 includes an analysis controller 21 for controlling the measurement unit 1, a measurement method creator 22 for preparing a measurement method, as well as a measurement condition storage section 23 for storing prepared measurement method files and compound tables.

The data processing unit 3 includes a measurement data storage section 31, quantitative calculator 32, and quantitative analysis assistant 33. The quantitative analysis assistant 33 includes a quantitative information display processor 331, compound specification receiver 332, and identical-name-compound searcher 333 as its functional blocks. The quantitative information display processor 331 corresponds to the table creation processor and the information display processor in the present invention.

Typically, most of the functions of the data processing unit 3 and the control unit 2 are realized by executing, on a personal computer (or more sophisticated workstation), a piece of dedicated controlling-processing application software previously installed on the same computer. In that case, the input unit 5 is the keyboard or pointing device (e.g. mouse) originally provided for the computer, while the display unit 6 is the display monitor of the computer.

In the case of a simultaneous multicomponent analysis for quantitative determination, it is normally the case that the target compounds to be subjected to the measurement are previously known, and those information of those target compounds are stored in the form of a compound table in the measurement condition storage section 23. In advance of a measurement for a sample, the analysis operator prepares a measurement method including various measurement conditions in the measurement unit 1. The measurement method creator 22 assists the analysis operator in preparing the measurement method. The prepared measurement method is saved as a file to the measurement condition storage section 23. For example, the measurement method includes the GC separation conditions in the GC section 11, such as the flow rate of the carrier gas and the temperature program of the column oven, as well as the multiple reaction monitoring (MRM) measurement conditions in the MS/MS section 12, such as the collision energy and the relationship between the measurement time range and the MRM transition (mass-to-charge ratios of a precursor ion and a product ion) which is the target of the MRM measurement. It is hereinafter assumed that two measurement methods A and B including different measurement conditions have been prepared as the measurement methods for the same sample and stored in the measurement condition storage section 23

The analysis operator using the input unit 5 specifies a measurement method to be used for the measurement and issues a command to initiate the measurement. Then, the analysis controller 21 reads the specified measurement method file from the measurement condition storage section 23, and controls the GC section 11 and the MS/MS section 12 according to the measurement conditions described in the file to perform the measurement. Specifically, in the GC section 11, the plurality of compounds in the sample are temporally separated. The intensity of an ion originating from each compound (a specific product ion generated from a specific precursor ion) is detected with the passage of time in the MS/MS section 12. The whole data obtained through such a measurement are saved as a single data file to the measurement data storage section 31 in the data processing unit 3. In the present example, two measurements are performed for the same sample according to two measurement methods A and B, and one data file is created in each measurement. The data file obtained under the measurement conditions of measurement method A is hereinafter called "data file A", and the one obtained under the measurement conditions of measurement method B is called "data file B".

Parallel to the measurement, or subsequently to the completion of the measurement, the quantitative calculator 32 reads a data file from the data storage section 31 and performs a quantitative calculation for each compound based on the data. Specifically, based on each set of data obtained by an MRM measurement corresponding to one compound, a mass chromatogram covering a predetermined measurement time range is created, and the area of a peak on the mass chromatogram is calculated. Then, the content (or concentration) of the compound is calculated from the peak area value with reference to a previously given calibration curve. The quantitative value, peak area value and other data obtained in this manner are also stored in the same data file.

That is to say, data files A and B contain data which are measurement results obtained by the measurements performed on the same sample, and data which are quantitative determination results calculated from those measurement results. With the two data files A and B thus stored in the measurement data storage section 31, an analyzing task for comparing the measurement results and quantitative determination results based on the two data files is performed, as will be hereinafter described with reference to FIGS. 2 and 3.

The analysis operator performs a predetermined operation on the input unit 5 to execute the quantitative analysis assistant program installed on the computer. This makes the quantitative analysis assistant 33 begin to function (Step S1). The analysis operator subsequently performs a predetermined operation on the input unit 5 to specify the two data files A and B to be analyzed (Step S2). After the data files have been specified, the quantitative information display processor 331 sequentially reads the selected data files from the data storage section 31. Then, based on the data stored in data file A, the same processor creates a quantitative table which lists the quantitative values and other data related to the individual compounds subjected to the measurement, and displays the table on the view area "a" on the left half of a quantitative browser window displayed on the display unit 6 (Step S3). As shown in FIG. 4, the view area "a" has a table display area 100, mass spectrum display area 101, mass chromatogram display area 102, calibration curve display area 103, and quantitative value display area 104. The quantitative table is displayed in the table display area 100.

Additionally, based on the data stored in data file B, the quantitative information display processor 331 creates another quantitative table which lists the quantitative values and other data related to the individual compounds subjected to the measurement, and displays the table on the view area "b" on the right half of the quantitative browser window displayed on the display unit 6 (Step S4). Thus, the view areas "a" and "b" each of which includes a quantitative table are displayed side by side on the screen of the display unit 6.

Each row of the quantitative table shows a compound name along with the corresponding measurement result and quantitative determination result. In the case of a simultaneous multicomponent analysis, there are normally a considerable number of compounds subjected to the measurement, and it is therefore necessary to vertically scroll the quantitative table to check all compound names. When the analysis operator is interested in a specific compound for which the measurement results and quantitative determination results based on the two data files A and B should be compared, the analysis operator selects the name of the compound of interest by clicking it with the pointing device in the quantitative table on one of the view areas, e.g. view area "a" (Step S5). The compound specification receiver 332 receives this operation and highlights the row of that compound on the quantitative table. The quantitative information display processor 331 displays the chromatogram, mass spectrum and other related information corresponding to the selected compound in the areas 101-104 other than the table display area 100 on the view area "a" (Step S6). In the example of FIG. 4, the compound "molinate" is selected in the quantitative table on the view area "a". Meanwhile, the identical-name-compound searcher 333 searches the quantitative table on the view area "b" for a compound having a name identical to the selected compound (Step S7).

If the identical-name compound has been located in the quantitative table on the view area "b" ("Yes" in Step S8), the identical-name-compound searcher 333 vertically scrolls the quantitative table so that the row corresponding to that compound in the table will be located near the middle of the vertical direction, and highlights the row corresponding to the compound (Step S9). In FIG. 4, the compound "molinate" selected in the quantitative table on the view area "a" has been searched for and located in the quantitative table on the view area "b". The quantitative information display processor 331 displays the chromatogram, mass spectrum and other related information corresponding to the located compound in the areas 101-104 other than the table display area 100 on the view area "b" (Step S10).

If a compound having a name identical to the selected compound has not been located in the quantitative table on the view area "b" ("No" in Step S8), the identical-name-compound searcher 333 displays a popup message on the screen to notify that no such compound is present (Step S11).

Contrary to the previous description, the analysis operator may select and indicate a compound in the quantitative table on the view area "b", in which case the identical-name compound is searched for and highlighted in the quantitative table on the view area "a". In other words, when a compound is selected and indicated in one of the quantitative tables displayed on the same quantitative browser, the other quantitative tables are searched for the identical-name compound.

Thus, in a quantitative analysis using the GC-MS system according to the present invention, the analysis operator can easily and efficiently compare the results of measurements performed on the same sample under different measurement conditions as well as the quantitative determination results calculated from those measurement results, to select appropriate measurement conditions, for example.

In the Twin Line MS system disclosed in Non Patent Literature 3, two different columns can be installed in one device, and measurements through the two columns can be continuously performed. The result of the measurement using each column can be individually saved in a separate data file. By performing the previously described quantitative analysis based on the two data files obtained in this manner, the quantitative analysis in the Twin Line MS system can be efficiently performed.

Although the measurement unit 1 in the previous embodiment is a GC-MS (GC-MS/MS), a set of data obtained by a measurement with an LC-MS can also be saved as a file in a similar format. This allows the result obtained with the LC-MS to be compared with the result obtained with the GC-MS. Needless to say, the previously described quantitative analysis is also evidently useful for an analysis based on data obtained with an LC-MS, or for an analysis based on data obtained with a normal LC or GC which employs no mass spectrometer. The present invention is also applicable in a quantitative analysis based on data obtained with an analyzing device for determining the quantities of a plurality of elements contained in a sample, in place of an analyzing device for determining the quantities of a plurality of compounds contained in a sample.

In the previous embodiment, two data files A and B are opened on the same quantitative analysis assistant program and separately displayed in two view areas "a" and "b" on the single quantitative browser. It is also possible to configure the quantitative analysis assistant program so that the program can be executed multiple times on a single computer to display a plurality of quantitative browsers and open one data file on each browser to perform the previously described processes. In other words, the plurality of quantitative tables may be arranged in a single quantitative browser or multiple quantitative browsers. In the latter case, the program should have the function of conducting a coordinated search for a compound in the quantitative tables on the separate quantitative browsers.

Furthermore, any change, modification or addition appropriately made within the spirit of the present invention in any other aspects will also evidently fall within the scope of claims of the present application.

REFERENCE SIGNS LIST

1 . . . Measurement Unit
11 . . . GC Section
12 . . . MS/MS Section
2 . . . Control Unit
21 . . . Analysis Controller
22 . . . Measurement Method Creator
23 . . . Measurement Condition Storage Section
3 . . . Data Processing Unit
31 . . . Measurement Data Storage Section
32 . . . Quantitative Calculator
33 . . . Quantitative Analysis Assistant
331 . . . Quantitative Information Display Processor
332 . . . Compound Specification Receiver
333 . . . Identical-Name-Compound Searcher
5 . . . Input Unit
6 . . . Display Unit

The invention claimed is:

1. An analytic data analyzer, including a hardware processor, for quantitatively analyzing a plurality of components based on data obtained by a measurement of a sample containing the plurality of components, the analytic data analyzer comprising:
 a) a table creation processor for creating tables based on a plurality of data files specified by an analysis operator, one table for each data file, and for displaying the tables concurrently or in a switchable manner on a screen of a display unit, where each of the data files contains data obtained by a single measurement, and each of the tables lists measurement results and/or quantitative determination results for a plurality of components subjected to the measurement;
 b) a component specifier for allowing an analysis operator to select and specify any one of the components in one of the plurality of tables displayed concurrently or in a switchable manner on the screen of the display unit;
 c) an identical-name-component searcher for searching another one of the tables for an identical-name component which is a component having a name identical to the component specified by the component specifier, and for selecting the identical-name component in the table concerned when the identical-name component is located; and
 d) an information display processor for concurrently displaying a measurement result and/or quantitative determination result for the one component specified in one table by the component specifier, as well as a measurement result and/or quantitative determination result for the identical-name component located by the identical-name-component searcher, along with the plurality of tables on the screen of the display unit, based on the plurality of data files.

2. The analytic data analyzer according to claim 1, wherein the analytic data analyzer quantitatively analyzes a plurality of components based on data obtained by a measurement of a sample containing the plurality of components performed with a device selected from a gas chromatograph, a liquid chromatograph, a gas chromatograph mass spectrometer, and a liquid chromatograph mass spectrometer.

3. A non-transitory computer readable medium recording an analytic data analyzing program, wherein the program makes a computer operate as the analytic data analyzer according to claim 1.

4. A non-transitory computer readable medium recording an analytic data analyzing program, wherein the program makes a computer operate as the analytic data analyzer according to claim 2.

* * * * *